US00RE43848E

(19) United States
(12) Reissued Patent
Benson

(10) Patent Number: US RE43,848 E
(45) Date of Reissued Patent: Dec. 11, 2012

(54) COMMUNICATION METHOD AND APPARATUS IMPROVEMENTS

(75) Inventor: Keith Benson, Reston, VA (US)

(73) Assignee: VSIM Patent Co, LLC, Redmond, WA (US)

(21) Appl. No.: 11/448,117

(22) Filed: Jun. 7, 2006

Related U.S. Patent Documents

Reissue of:
(64) Patent No.: 6,747,547
Issued: Jun. 8, 2004
Appl. No.: 09/594,016
Filed: Jun. 15, 2000

U.S. Applications:
(63) Continuation-in-part of application No. PCT/AU99/00455, filed on Jun. 11, 1999.

(30) Foreign Application Priority Data

Jun. 15, 1998 (AU) ..... PP4110

(51) Int. Cl.
*H04Q 5/22* (2006.01)

(52) U.S. Cl. ..... 340/10.4; 340/10.1; 455/552.1; 455/556.1; 455/557; 455/558

(58) Field of Classification Search ..... 340/10.4, 340/10.1; 455/552.1, 556.1, 558, 575; 439/500, 439/371, 164, 165; 235/380
See application file for complete search history.

(56) References Cited

U.S. PATENT DOCUMENTS 3,829,706 A * 8/1974 Seip ..... 379/111
4,677,653 A 6/1987 Weiner et al.
5,348,485 A * 9/1994 Briechle et al. ..... 455/558
5,353,328 A * 10/1994 Jokimies ..... 455/558
5,428,666 A 6/1995 Fyfe et al.
(Continued)

FOREIGN PATENT DOCUMENTS

AU PN7551 1/1996
(Continued)

OTHER PUBLICATIONS

T. Grigorova et al., "Sim Cards", *Telecommunication Journal of Austrialia,* vol. 43, No. 2, pp. 33-38, 1993.

(Continued)

*Primary Examiner* — Nam V Nguyen
(74) *Attorney, Agent, or Firm* — The Blair Law Firm; Donald J. Ersler

(57) ABSTRACT

A remote communication apparatus such as a mobile digital telephone adapted to receive interrogation from time to time with respect to the identification of a user of the apparatus from a network provider and including means to hold an identification module within the apparatus which can provide for that authentication of the user to an external interrogation from time to time, with an appropriate identification module means to receive any interrogation signals and adapted in the case that the identification signals are appropriate for seeking identification of a network providers subscriber identification module, then effecting a direction of such incoming inquiry signals to information being stored whereby the appropriate identification can be provided in reply, and in the event of an interrogation other than from the network provider, then, as appropriate, directing such further interrogation to other memory means the further memory means including either passive memory or memory contained on removable means such as a smart card, a multi-media card or the like.

24 Claims, 4 Drawing Sheets

U.S. PATENT DOCUMENTS

| | | | | | |
|---|---|---|---|---|---|
| 5,541,985 | A | * | 7/1996 | Ishii et al. | 379/111 |
| 5,586,166 | A | | 12/1996 | Turban | |
| 5,669,069 | A | * | 9/1997 | Rautila | 455/558 |
| 5,815,426 | A | | 9/1998 | Jigour et al. | |
| 5,884,168 | A | * | 3/1999 | Kolev et al. | 455/432.1 |
| 5,894,597 | A | | 4/1999 | Schwartz et al. | |
| 5,915,226 | A | * | 6/1999 | Martineau | 455/558 |
| 5,987,325 | A | * | 11/1999 | Tayloe | 455/435.2 |
| 6,012,634 | A | * | 1/2000 | Brogan et al. | 455/558 |
| 6,138,010 | A | * | 10/2000 | Rabe et al. | 455/426.1 |
| 6,169,908 | B1 | * | 1/2001 | Mannak | 455/426.1 |
| 6,185,436 | B1 | * | 2/2001 | Vu | 455/558 |
| 6,250,557 | B1 | | 6/2001 | Forslund et al. | |

FOREIGN PATENT DOCUMENTS

| | | | |
|---|---|---|---|
| AU | PN 7551 | | 7/1997 |
| EP | 0 556 970 | B1 | 8/1993 |
| EP | 556970 | | 8/1993 |
| EP | 0 586081 | B1 | 3/1994 |
| EP | 586081 | | 3/1994 |
| EP | 0 616 458 | B1 | 9/1994 |
| EP | 616458 | | 9/1994 |
| EP | 0 690 645 | A1 | 1/1996 |
| EP | 690645 | | 1/1996 |
| WO | WO89/00370 | | 1/1989 |
| WO | WO92/19078 | | 10/1992 |
| WO | WO 92/19078 | | 10/1992 |
| WO | WO94/08433 | | 4/1994 |
| WO | WO 94/08433 | | 4/1994 |
| WO | WO 95/12293 | | 5/1995 |
| WO | WO95/12293 | | 5/1995 |
| WO | WO 95/32590 | | 11/1995 |
| WO | WO95/32590 | | 11/1995 |

OTHER PUBLICATIONS

M. Brightman, "Connector Design in Portable Products", *Electronic Product Design,* p. 65-66, May 1995.

T. Grigorova, et al. "Sims Cards", Telecommunication Journal of Australia vol. 43, No. 2, pp. 33-35 (1993).

Briightman, "Connector design in portable products", Electronic Product Design, pp. 65-66 (May 1995).

* cited by examiner

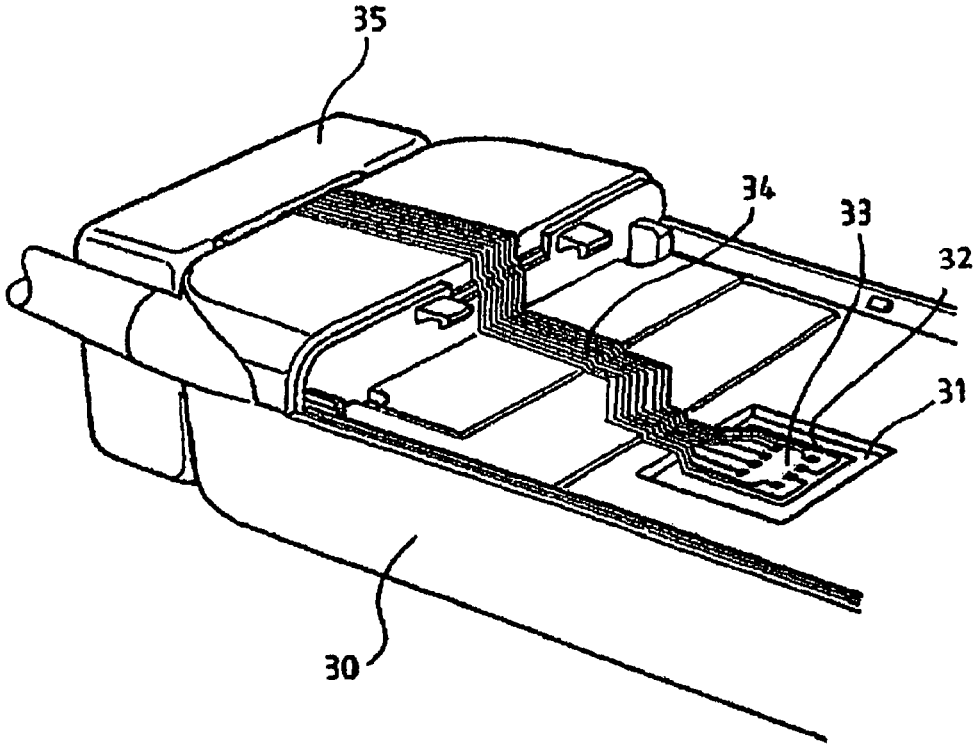
FIG 5
AMENDED

COMMUNICATION METHOD AND APPARATUS IMPROVEMENTS

Matter enclosed in heavy brackets [ ] appears in the original patent but forms no part of this reissue specification; matter printed in italics indicates the additions made by reissue.

This application is a continuation-in-part of international application number PCT/AU99/00455, filed Jun. 11, 1999, the content of which is incorporated herein by reference.

FIELD OF INVENTION

This invention relates to communication apparatus and methods and in particular to communication methods and devices requiring identity authentication such as cellular mobile phones for interconnection with a network.

The invention will be described with respect to cellular mobile phones but it is not intended that the invention in its broadest sense should be restricted to such devices.

BACKGROUND OF THE INVENTION

The problem to which this invention is directed relates to a current method by which identification for authentication purposes and subsequent connection to and retention with a network service provider is achieved with respect to cellular mobile phones.

It is conventional that a person requiring the services of a network shall enter into a contract with a network provider who then provides a subscriber identification module which is inserted within a mobile phone and which is thereafter able to be accessed by the network provider to establish that use of the network is authorised and continues to be authorised for access to that network. It is the subscriber identification module which is accessed by the network provider that provides the identification and authentication necessary for charging or other regulatory process as far as a selected network service provider is concerned.

Currently, access to that authentication information is controlled entirely by the network provider who for commercial and contractual reasons will wish to maintain the absolute confidentiality of such information.

However, there could be considerable value to others who provide different services, if a further identification or authentication process could be available through the network or using the similar or same equipment but not subject to approval from the network provider.

For instance, banks, regulatory authorities such as policing personnel, and even those involved in ordinary commerce could all be advantaged by such an ability but currently it would not appear economically feasible or even technically possible given current circumstances in existing technologies.

A first problem is that a mobile phone is only empowered to be connected to a network service provider for full communication services through a subscriber identification module (SIM). This not only carries data but is arranged to also run a program (for instance a GSM connect program) which has embedded information and generates data that is not available to any third party whereby data is communicated back to a service provider upon an appropriate interrogation signal being received. The security of this system is extremely important to the network service provider.

Further, much of the empowering software for the functions of a mobile phone is in the subscriber identification module so that if additional functionality is required (for third party access or etc) this will need to be installed in the SIM which is under the control of the network service provider. As such, the basis of any commercial arrangement is therefore going to be subject to permission and costs applied by the network provider.

A further complexity is the fact that equipment such as a mobile phone is provided by suppliers so that access to the internal circuits to modify these is likely to breach warranties for maintenance of a unit but is also possibly going to trigger security mechanisms which may destroy the circuits if interfered with. Further, many phones are supplied as a part of an ongoing contract and it would be a breach of some of the contract provisions if any unauthorised attempt is made to open the equipment to further make or modify electrical connections.

This leaves the position as seemingly to be strongly in the control of the providers of the networks and the mobile phones.

It is an object of this invention to provide an arrangement which will reduce the above problem.

DESCRIPTION OF THE INVENTION

In one form the invention can be said to reside in a digital mobile phone of a type including means to hold an identification member in electrical communication with its operating system for identification of a user, and a further arrangement adapted such that in the event of identification signals appropriate for seeking identification of a network providers subscriber identification module being received, then there are means effecting a direction of such incoming inquiry signals to information being stored whereby the appropriate identification can be provided in reply, and in the event of an interrogation other than from the network provider, directing such further interrogation to other memory means.

In a further preferred form the invention can be said to reside in a remote communication apparatus adapted to receive or effect interrogation from time to time with respect to the identification of a user of the apparatus and including means to hold a subscriber identification module within the apparatus which can provide for that authentication of the user to an external interrogation, characterised in that there is connected to the electrical contacts in a socket adapted to electrically connect with an appropriate subscriber identification module, intermediary processor means to receive any interrogation signals and adapted in the case that the identification signals are appropriate for seeking identification of a network providers subscriber identification module, then effecting a direction of such incoming interrogation signals to information being stored whereby the appropriate identification can be provided in reply, and in the event of an interrogation other than from the network provider, then as appropriate directing such further interrogation and other signals to other memory and transmission means.

In one embodiment the intermediary processor means may be incorporated within a mobile telephone at the time of manufacture or alternatively the intermediary processor means may be incorporated in an additional arrangement that can be connected to a mobile telephone.

Hence the remote communication apparatus may be further characterised in that the intermediary processor is a processor incorporated in the remote communication apparatus at original manufacture, said processor being the main CPU of the apparatus or alternatively an additional CPU incorporated in the original equipment.

Alternatively the intermediary processor is a processor incorporated in an attachment to the remote communication apparatus.

What is proposed in one embodiment of this invention is an arrangement that will have a take-off connector that will insert into and electrically connect with the available electrical contacts within a socket. Then there is provided the intermediate processor means which is electrically connected to one (or more) subscriber identification modules so that when connected electrically to the electrical connections in the phone act in a way that will act to send interrogation signals provided from the phone by reason of a startup signal or otherwise through to the SIM and transmit replies back from the SIM so that, to the network service provider, the effect is the same as if the SIM is in its appropriate location in the socket. However, this then allows for the processor to add its own functionality to the mobile phone or through this to others while as necessary, maintaining the ongoing connection with and through the network provider.

There is, therefore a piggy backing of existing normal devices and the networks of a cellular mobile phone system in a way that will be without breaching any current warranty or contract provision. Further, it becomes possible to use a transmission mode which in practice is now able to be accessed and controlled by the intermediate processor means in a cellular mobile telephone which is conventionally referred to as a short messaging service (SMS). This may allow for transmissions to occur at charging rates that are somewhat less expensive than voice communications. As such, data can be economically transferred through this arrangement.

In preference the remote communication apparatus is a cellular mobile phone.

In preference the intermediary processor includes a program and data and there is a removable unit reader which may receive removable units with data stored therein which data can be read through the reader and where the program and data of the intermediary processor are adapted to relate to and use such data when appropriate.

In preference, the removable unit reader is a smart card reader.

In an alternative preferred arrangement there are further memory means remote from the apparatus.

In such a case there can be a communication through an infrared link or wireless or wired connection to the apparatus.

In preference, the additional apparatus providing for intelligent routing of an interrogation signal can be attached and integrated with a power supply of the mobile phone.

In preference, there is at least a holder and reader for a further device that is attachable or attached to the mobile phone so that such additional reader or other receiving means can be used to insert for instance an authenticating smart card provided by an alternate supplier.

There may be more than one SIM card socket in the apparatus.

In preference then, the additional apparatus provides what in effect can be referred to as a virtual subscriber identification module by having an active central processing unit with appropriate programming held in appropriate memory so that it will be adapted to receive and appropriately respond in the case of appropriate interrogation signals being received by the network provider.

This can be achieved by providing that the subscriber identification module which is conventionally provided by the network provider can be in electrical contact with the processing unit so that in effect, when the appropriate interrogation signals are detected, the central processing unit will simply switch those signals through to the original subscriber identification module and this then will act in accord with conventional existing techniques.

The advantage of the invention however is that now that there is intelligent switching, and an ability to send different interrogation signals as well, the central processing unit can be programmed to respond to such alternate and different interrogation signals and as appropriate, direct these to an alternative active or passive authentication or identification means.

Active can mean that the authentication or identification means include a computer processor.

The additional identification means are accordingly not subject to any control by the network provider and therefore not subject to either the contractual restraints that might be required or imposed by the network provider, and can be used in addition to the conventional communication link which can still be maintained while the additional interrogation program is being operated.

In preference, such additional apparatus providing for intelligent switching is joined to existing electrical equipment as originally provided by a manufacturer by means which do not in substance alter the original equipment.

Accordingly, there can be in one instance provided circuitry which connects by contact with the original equipment and then through a highly flexible and adhering material, to provide continuing electrical connections to an external location by passing through conventional manufacturing gaps between housing conventionally existing in currently manufactured equipment.

Accordingly, in a number of mobile phones then, use can be made of the battery housing and connections providing for the holding of the battery in position with respect to the phone.

By having an alternate housing which has the appropriate physical interconnections to hold the battery both physically with the remaining housing of the mobile phone, and providing for electrical connections, then additional connections can be made and additional equipment can be included in the housing in addition to the batteries so as to provide for this intelligent switching and further, to provide for receipt of an authentication or identification module.

Such an apparatus can include a smart card reader which then can be provided by any alternate organisation wishing to use this facility and arranging for subscribers to establish a contractual relationship and be able to then in addition authenticate their relationship for different services.

It is well understood that appropriate programming and embedding techniques can be used to maintain continuing confidentiality as far as information on any further authenticating module or medium.

Reference has been made to mobile phones, but as previously explained, it is not intended that the application should be restricted necessarily to mobile phones.

Other equipment does require authentication from time to time for instance decoders for translation of television signals which might be connected by optical cable and otherwise to a signal provider, and such devices also then include an authentication module to ensure that a subscriber has an arrangement to effect payment for the services provided.

In accord with the general concept of this invention then, there would be provided active means to intercept any interrogation signal and to effect a redirection of this in the event that the signals contain information which would appear to the processor not to be for the purpose of interrogating the existing subscriber identification module but directing any interrogation signal to or from the subscriber identification module to a network provider in order to keep the access to the network open and useful.

In a further form the invention can be said to reside in a digital phone network where there is included in communication with the network a mobile digital phone with an arrangement as characterized in any one of the preceding claims.

In a further form the invention can be said to reside in a digital mobile phone of a type including means to hold an identification member in electrical communication with its operating system for identification of a user, and a further arrangement adapted such that in the event of identification signals appropriate for seeking identification of a network providers subscriber identification module being received then there are means effecting a direction of such incoming inquiry signals to information being stored whereby the appropriate identification can be provided in reply, and in the event of an interrogation other than from the network provider, directing such further interrogation to other memory means.

Such an arrangement as has been described has the further advantage that it would not appear to breach any contract that might exist between a user and a network provider. It will at least in most cases be expected to still use the network so that it will improve usage of the network to the advantage of the network provider, and it would not otherwise breach any warranty provisions by interfering with the original equipment being provided by a mobile phone or other apparatus provider.

BRIEF DESCRIPTION OF THE DRAWINGS

For a better understanding of this invention it will now be described with relation to an embodiment which shall be described with the assistance of drawings wherein:

FIG. 5 shows an alternative embodiment of additional apparatus suitable for the present invention and how it is connected to a SIM card socket.

DESCRIPTION OF PREFERRED EMBODIMENTS

Figure 1:
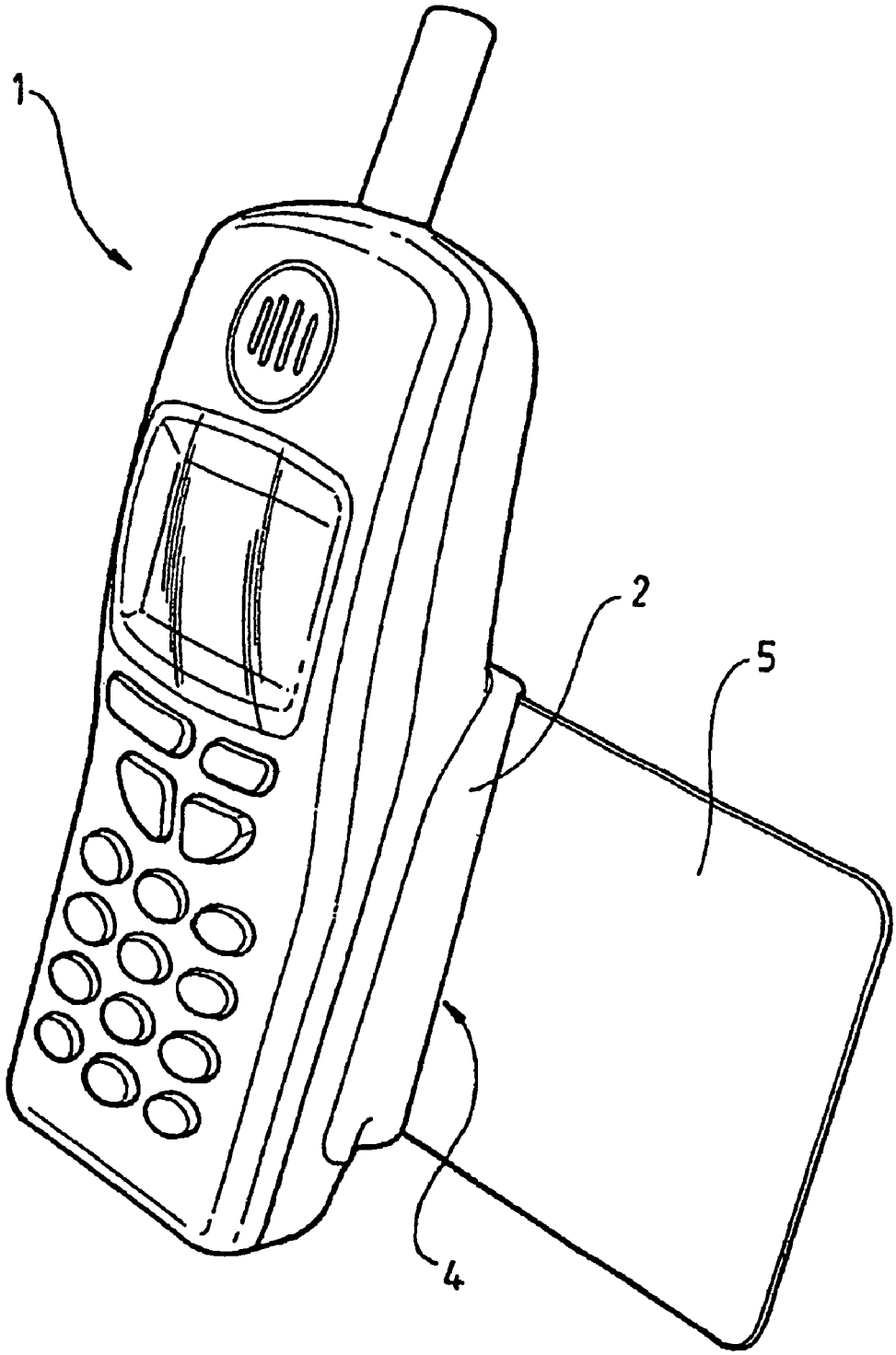
FIG. 1 shows a mobile telephone which has an alternative housing and which incorporates a SMART card reader.
Figure 2:
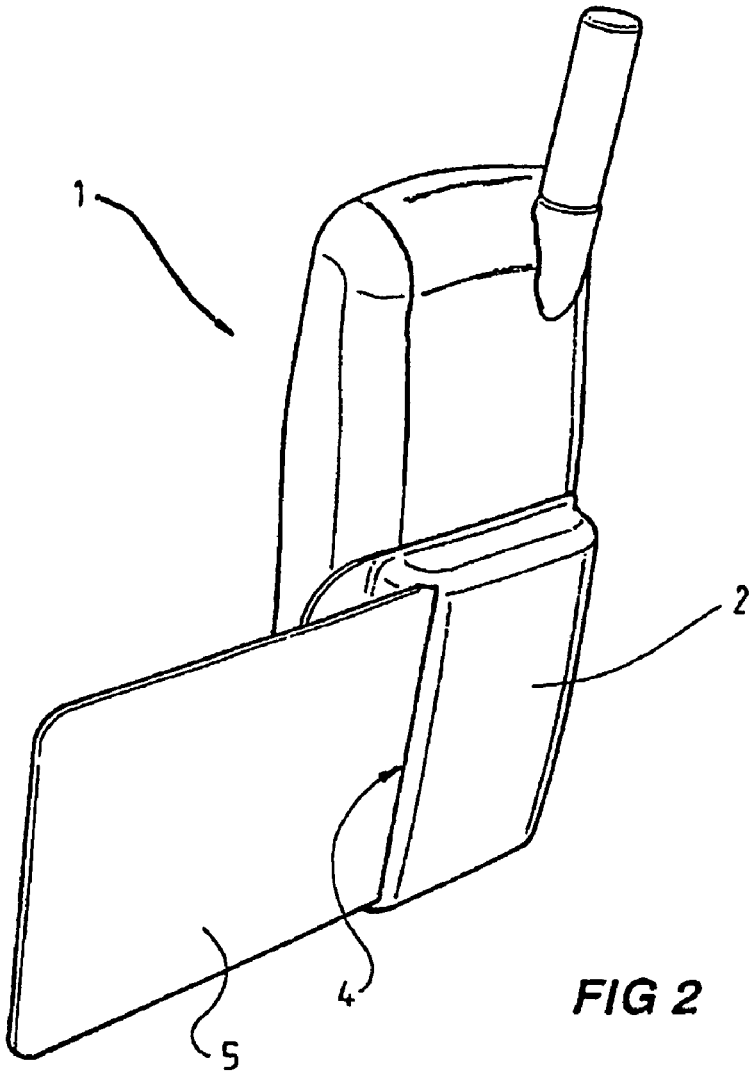
FIG. 2 shows a rear view of the embodiment as shown in FIG. 1.

Now looking more closely at the drawings and in particular FIGS. 1 and 2 it will be seen that the mobile phone has a body 1 which would normally have a battery pack at a lower rear portion but as modified includes as a lower rear portion an alternative battery and apparatus back pack 2. Otherwise the mobile phone is standard and no modification is necessary.

Figure 3:
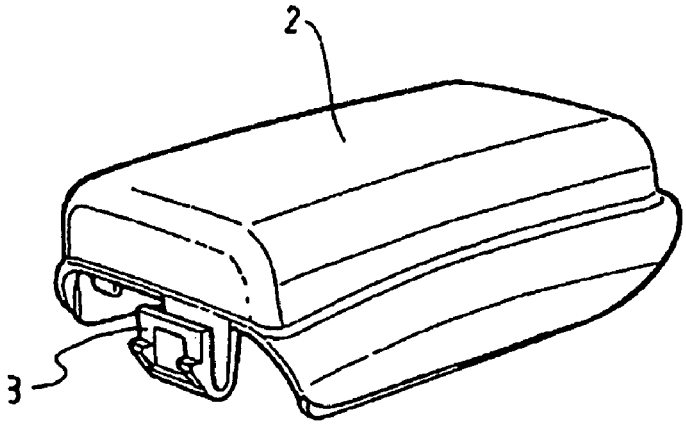
FIG. 3 shows the alternative housing which is mounted onto the rear of a mobile phone instead of the battery pack and which incorporates the battery pack and the apparatus of the present invention.

As can be seen in FIG. 3, the alternative battery and apparatus back pack 2 has a clip arrangement 3 to enable it to be mounted into an existing battery bay of the mobile phone. Means to connect the existing SIM card slot and the necessary electrical connections are not shown. On one side of the alternative back is a slot 4 into which a SMART card 5 may be inserted so that information on the SMART card can be read from and transferred to the card as required.

Figure 4:
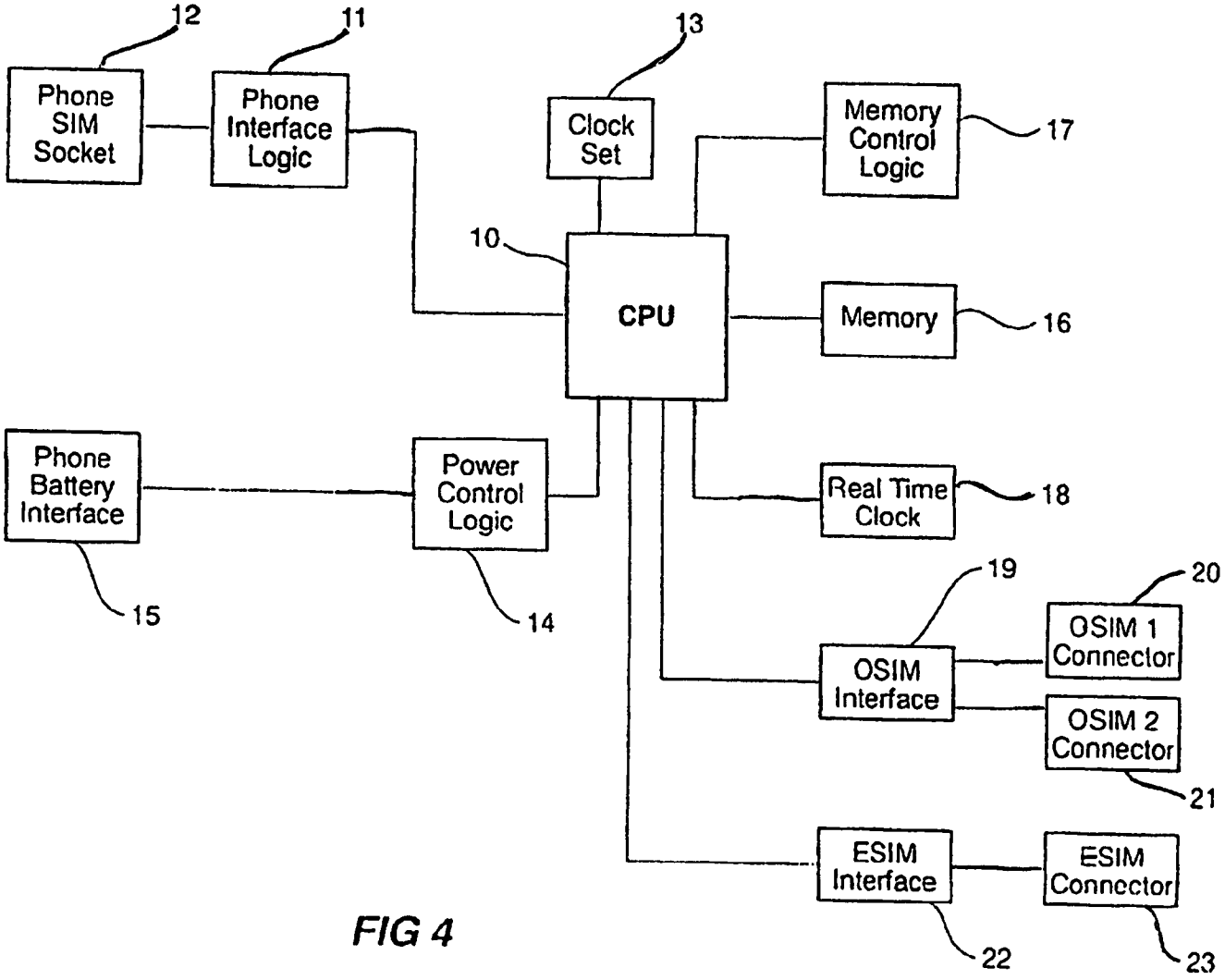
FIG. 4 shows a schematic circuit layout for the apparatus of the present invention.

FIG. 4 shows a block diagram of a schematic layout of the circuitry and connections of a device of one embodiment of the present invention. The circuitry includes a central processing unit 10 which is connected through a phone interface logic arrangement 11 to the existing phone SIM socket 12 within the mobile telephone. The CPU has a clock arrangement 13 and a power controller logic 14 which connects to a phone battery interface 15. The CPU has memory 16 and memory control logic 17 and a real time clock 18. Also connected to the CPU is an OSIM interface and an ESIM interface. The OSIM interface 19 includes a first OSIM connector 20 and a second OSIM connector 21. Separate SIM cards may be connected to the first and second OSIM connectors so that more than one or another telephone service provider may be used with the device of the present invention. The ESIM interface 22 includes an ESIM connector 23, the ESIM connector may be a SMART card reader or some other device.

Alternatively when the remote communication apparatus has its intermediary processor as the processor incorporated in the remote communication apparatus at original manufacture then the CPU 10 may be not a separate processor but the CPU in the mobile phone or other item of equipment. In such a situation the phone interface logic arrangement 11 connected to the existing phone SIM socket 12 within the mobile telephone would not be necessary.

An alternative embodiment of attachment to a mobile phone according to this invention is shown in FIG. 5. In this embodiment the mobile phone 30 has its battery pack removed to show the ESIM socket 31 inside the battery compartment. In this arrangement the SIM card has been removed from the SIM card socket 32 and a connector including a phone SIM socket 33 which has a ribbon cable 34 extending from it to an attachment 35. The attachment 35 includes the type of circuitry as shown in FIG. 4 and specifically includes at least one socket for a SIM card which otherwise would have been inserted in the socket 31.

The added functionality provided within the circuitry of the attachment 35 may be accessed using the normal telephone keyboard and screen.

Throughout this specification various indications have been given as to the scope of this invention but the invention is not limited to any one of these but may reside in two or more of these combined together.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

What is claimed is:

1. An intelligent switching apparatus for use with a remote communication apparatus adapted to receive interrogation from [lime] *time* to time with respect to the identification of a user of the apparatus and including means to hold a subscriber identification module within the remote communication apparatus which can provide for that authentication of the user to an external interrogation from time to time, the means to hold a subscriber identification module having electrical contacts for connecting with the subscriber identification module, the intelligent switching apparatus comprising:

an intermediary processor connectable to the electrical contacts and adapted to receive interrogation signals from the remote communications apparatus and only in the case that the interrogation signals are appropriate for seeking identification of and from the subscriber identification module, to effect a direction of such incoming inquiry signals to the attached subscriber identification module whereby appropriate identification can be provided in reply, and in the event that the interrogation signals are not appropriate for seeking identification of and from the subscriber identification module, then as appropriate to direct such further interrogation to other memory means, wherein such additional apparatus providing for intelligent switching is joinable to existing electrical equipment as originally provided by a manufacturer by means which do not in substance alter the original equipment.

2. An intelligent switching apparatus as in claim 1 wherein the intermediary processor is a processor that is installable in the remote communication apparatus at original manufacture, said processor being the main CPU of the apparatus or alternatively an additional CPU incorporated in the original equipment.

3. An intelligent switching apparatus as in claim 1 wherein the intermediary processor is a processor incorporated in an attachment to the remote communication apparatus.

4. An intelligent switching apparatus as in claim 1 wherein the other memory means include either passive memory or memory contained on removable means such as a smart card, or a multi-media card or the like.

5. An intelligent switching apparatus as in claim 1 wherein the remote communication apparatus is a cellular mobile phone.

6. An intelligent switching apparatus as in claim 1 wherein the remote communication apparatus has sockets to receive a plurality of subscriber identification modules.

7. An intelligent switching apparatus as in claim 1 wherein the other memory means are remote from the apparatus and there are communication means selected from an infrared link or wireless or a wired connection to the apparatus.

8. An intelligent switching apparatus as in claim 1 wherein there is at least a holder and reader for a further device that is attachable or attached to the remote communication apparatus so that such additional reader or other receiving means can be used to receive an authenticating smart card provided by an alternate supplier.

9. An intelligent switching apparatus as in claim 1 wherein the apparatus provides a virtual subscriber identification module by having [and] *an* active central processing unit with appropriate programming held in appropriate memory so that it will be adapted to receive and appropriately respond in the case of appropriate interrogation signals being received.

10. An intelligent switching apparatus as in claim 9 wherein a subscriber identification module which is conventionally provided by the network provider is in electrical contact with the processing unit so that, when appropriate interrogation signals are detected, the central processing unit will switch associated following signals through to the original subscriber identification module.

11. An intelligent switching apparatus as in claim 1 wherein there is provided circuitry which connects by contact with original equipment and then through a flexible and adhering material, to provide continuing electrical connections to an external location by passing through conventional manufacturing gaps between housing conventionally existing in currently manufactured equipment.

12. An intelligent switching apparatus as in claim 1 further comprising a housing configured for disposition of a battery therein and for selective attachment to a battery bay of the remote communication apparatus, the housing having appropriate physical interconnections to connect the battery to the remote communication apparatus to provide power thereto and to provide power to the intermediary processor.

13. An intelligent switching [arrangement] *apparatus* as in claim 12 wherein the [intermediate] *intermediary* processor means includes means to effect input and output signals to effect control to and from the keyboard, screen and radio frequency transmission and receiving means of the mobile phone to which it is adapted to be attached.

14. An intelligent switching [arrangement] *apparatus* as in claim 12 further including a smart card reader.

15. An intelligent switching apparatus as in claim 1 further comprising a smart card reader.

16. An intelligent switching apparatus according to claim 1 wherein the other memory means include at least one of a subscriber identification module and a memory module in communication with the intermediary processor.

17. An intelligent switching apparatus according to claim 1 wherein the other memory means includes at least one socket, each of the at least one socket being configured for removable disposition of one of a subscriber identification module and a memory module therein, the at least one socket being in communication with the intermediary processor.

18. An intelligent switching arrangement including a take-off connector adapted to be inserted into and be electrically connected with available electrical contacts within an identification module socket within a cellular mobile digital phone, an [intermediate] *intermediary* processor means which is electrically connected to at least one subscriber identification module not located in the identification module socket, the [intermediate] *intermediary* processor means being adapted so that when connected electrically to the electrical connections in the phone, the [intermediate] *intermediary* processor means can identify interrogation signals seeking identification from the subscriber identification module and direct such interrogation signals provided from the phone by reason of a startup signal or otherwise through to the subscriber identification module and transmit replies back from the subscriber identification module so that, to a network service provider, the effect will be substantially the same as if the subscriber identification module is in its appropriate location in the identification module socket, wherein the intelligent switching arrangement is joinable to existing electrical equipment as originally provided by a manufacturer by means which do not in substance alter the original equipment.

19. An intelligent switching apparatus for use with a digital mobile phone of a type including means to hold an identification member in electrical communication with its operating system for identification of a user, the intelligent switching apparatus having a processor in communication with the means to hold an identification member, the processor being adapted such that only in the event of identification signals appropriate for seeking identification of a network provider's subscriber identification module being received, the processor directs such identification signals to the network provider's subscriber identification module whereby the appropriate identification can be provided in reply, and in the event of an interrogation other than from the network provider, directing such further interrogation to other memory means, wherein the intelligent switching apparatus is joinable to existing electrical equipment as originally provided by a manufacturer by means which do not in substance alter the original equipment.

20. An intelligent switching apparatus for use with a remote communication apparatus having a first subscriber identification module holder having contacts for establishing electrical communication with a first subscriber identification module, the remote communication apparatus being adapted for receiving interrogation signals with respect to user identification information stored on the first subscriber identification module, the intelligent switching apparatus comprising:

a connector adapted for connecting to the contact of the first subscriber identification module holder; and an intermediary processor in electrical communication with the connector and being connectable to the first subscriber identification module, the intermediary processor being adapted to receive interrogation signals from the remote communications apparatus and only in the case that the interrogation signals are appropriate for seeking identification of and from the first subscriber identification module, then directing the interrogation signals to the first subscriber identification module and in the event that the interrogation signals are not appropriate for seeking identification of and from the first subscriber identification module, then directing the interrogation signals to other memory means, wherein the intelligent switching apparatus is joinable to existing electrical equipment as originally provided by a manufacturer by means which do not in substance alter the original equipment.

*21. An intelligent switching method used with a remote communication apparatus adapted to receive interrogation from time to time with respect to the identification of a user of the apparatus and including means to hold a subscriber identification module within the remote communication apparatus which can provide for that authentication of the user to an external interrogation from time to time, the means to hold a subscriber identification module having electrical contacts for connecting with the subscriber identification module, the intelligent switching method comprising: an intermediary processor connectable to the electrical contacts and adapted to receive interrogation signals from the remote communications apparatus and only in the case that the interrogation signals are appropriate for seeking identification of and from the subscriber identification module, to effect a direction of such incoming inquiry signals to the attached subscriber identification module whereby appropriate identification can be provided in reply, and in the event that the interrogation signals are not appropriate for seeking identification of and from the subscriber identification module, then as appropriate to direct such further interrogation to other memory means, wherein such additional method providing for intelligent switching comprises apparatus joinable to existing electrical equipment as originally provided by a manufacturer by means which do not in substance alter the original equipment.*

*22. An intelligent switching method as in claim 21 wherein the intermediary processor is a processor that is installable in the remote communication apparatus at original manufacture, said processor being the main CPU of the apparatus or alternatively an additional CPU incorporated in the original equipment.*

*23. An intelligent switching method as in claim 21 wherein the other memory means include either passive memory or memory contained on removable means such as a smart card, or a multi-media card or the like.*

*24. An intelligent switching method as in claim 21 wherein the other memory means are remote from the apparatus and there are communication means selected from an infrared link or wireless or a wired connection to the apparatus.*

* * * * *